United States Patent
Al Ismail et al.

(10) Patent No.: US 11,525,352 B2
(45) Date of Patent: Dec. 13, 2022

(54) METHOD AND SYSTEM TO AUTOMATE FORMATION TOP SELECTION USING WELL LOGS

(71) Applicant: SAUDI ARABIAN OIL COMPANY, Dhahran (SA)

(72) Inventors: Marwah Al Ismail, Savhat (SA); Mokhles M. Mezghani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 271 days.

(21) Appl. No.: 16/862,691

(22) Filed: Apr. 30, 2020

(65) Prior Publication Data
US 2021/0340861 A1    Nov. 4, 2021

(51) Int. Cl.
*E21B 47/04* (2012.01)
*E21B 49/00* (2006.01)
*G01V 99/00* (2009.01)

(52) U.S. Cl.
CPC .............. *E21B 47/04* (2013.01); *E21B 49/00* (2013.01); *G01V 99/005* (2013.01); *E21B 2200/20* (2020.05)

(58) Field of Classification Search
CPC ...... E21B 47/04; E21B 49/00; E21B 2200/20; G01V 99/005
See application file for complete search history.

(56) References Cited

U.S. PATENT DOCUMENTS

| | | |
|---|---|---|
| 4,357,660 A | 11/1982 | Hepp |
| 6,804,625 B1 | 10/2004 | Bryant |
| 8,660,797 B2 * | 2/2014 | Xu .................. G01V 11/00 702/11 |
| 10,510,167 B2 * | 12/2019 | Vennelakanti ....... G06T 11/001 |
| 2004/0117121 A1 | 6/2004 | Gray et al. |
| 2009/0024371 A1 | 1/2009 | Xu et al. |
| 2015/0088424 A1 * | 3/2015 | Burlakov .............. G01V 11/00 702/6 |
| 2017/0248719 A1 | 8/2017 | Holman et al. |
| 2019/0331813 A1 | 10/2019 | Zhang et al. |

FOREIGN PATENT DOCUMENTS

| | | |
|---|---|---|
| CN | 109736720 A | 5/2019 |
| WO | 2015/042103 A1 | 3/2015 |
| WO | 2018208281 A1 | 11/2018 |

OTHER PUBLICATIONS

International Search Report issued in PCT/US2020/033899, dated Jan. 20, 2021 (5 pages).
Written Opinion of the International Searching Authority issued in PCT/US2020/033899, dated Jan. 20, 2021 (11 pages).

* cited by examiner

*Primary Examiner* — Franklin D Balseca
(74) *Attorney, Agent, or Firm* — Osha Bergman Watanabe & Burton LLP (57) ABSTRACT

A method may include obtaining a request to determine automatically a depth of a formation top for a well in a geological region of interest. The method may include obtaining various well logs regarding the well and various wells in the geological region of interest. The method may include determining various depth values using the various well logs and a statistical interpolation method. The method may further include determining a final depth of the well using the various depth values and a searching method.

17 Claims, 6 Drawing Sheets

420 Search Window Size Attribute = 100 Feet

430 Closest Training Well Depth Attribute = 5120 Feet

440 Correlation Window Size Attribute = 4 Feet

Depth A 431 = 5000 Feet

Depth B 432 = 5015 Feet

Correlation Window of 4ft 440

Depth M 442 = 5048 Feet

Depth N 443 = 5050 Feet

Depth O 444 = 5052 Feet

Depth X 433 = 5085 Feet

Depth Y 434 = 5100 Feet

Search Function 460

Initial Depth Guess = 5050 Feet

Search Window of 100ft 420

METHOD AND SYSTEM TO AUTOMATE FORMATION TOP SELECTION USING WELL LOGS

BACKGROUND

Formation top predictions are commonly used in the oil and gas industry, and small variations between predicted depths and actual depths of a formation top may impact hydrocarbon exploration and production. Current formation top predictions may be performed manually, and are heavily dependent on a geologist's expertise. Consequently, human predictions introduce subjectivity and errors in the process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, embodiments relate to a method that includes obtaining, by a computer processor, a request to determine automatically a depth of a formation top for a well in a geological region of interest. The method further includes obtaining, by the computer processor, various well logs regarding the well and various wells in the geological region of interest. The method further includes determining, by the computer processor, various depth values using the various well logs and a statistical interpolation method. The method further includes determining, by the computer processor, a final depth value of the well using the various depth values and a searching method.

According to one aspect, embodiments relate to a system that includes a logging system coupled to various logging tools. The system further includes a reservoir simulator including a computer processor, where the reservoir simulator is coupled to the logging system. The reservoir simulator obtains a request to determine automatically a depth of a formation top for a well in a geological region of interest. The reservoir simulator further obtains various well logs regarding the well and various wells in the geological region of interest. The reservoir simulator further determines various depth values using the various well logs and a statistical interpolation method. The reservoir simulator further determines a final depth value for the well using the various depth values and a searching method.

According to one aspect, embodiments relate to a non-transitory computer readable medium storing instructions executable by a computer processor. The instructions obtain a request to determine automatically a depth of a formation top for a well in a geological region of interest. The instructions further obtain various well logs regarding the well and various wells in the geological region of interest. The instructions further determine various depth values using the various well logs and a statistical interpolation method. The instruction further determine a final depth value for the well using the various depth values and a searching method.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining a depth of the top of a formation underlying a new well using well logs from training wells. Training wells may be well sites in the general geological vicinity of a new well, where the depths of formation tops have already been determined. In order to avoid human negligence or error, for example, one or more embodiments include using various types of correlation scores to iteratively select a formation top depth. In particular, well logs from the closest training well may be used to analyze an initial depth guess of a formation top. By introducing mathematics and statistics, an optimization algorithm may standardize the depth selection process while also optimizing the final depth value output from the depth selection process.

Figure 1:
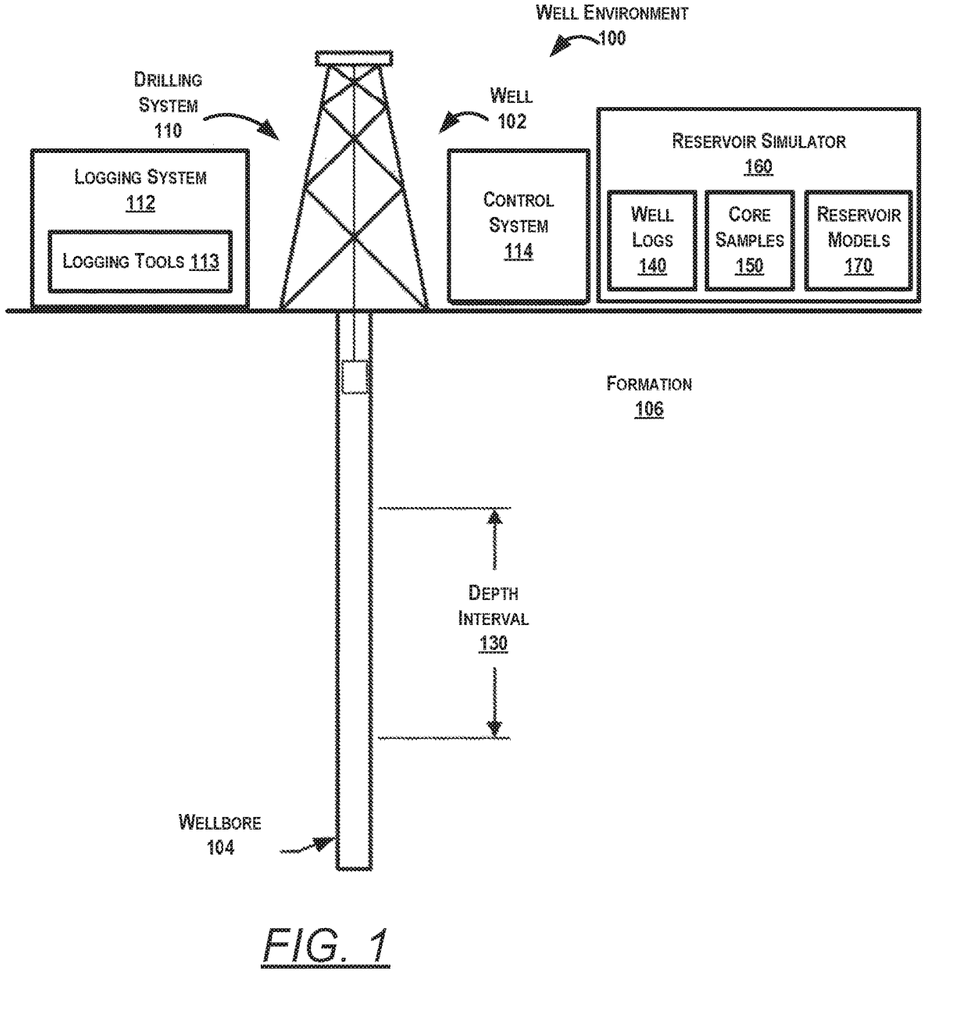
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, water saturation, free water level (FWL), and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir simulator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

A reservoir simulator (160) may include hardware and/or software with functionality for generating one or more reservoir models (170) regarding the formation (106). For example, the reservoir simulator (160) may store well logs (140) and data regarding core samples (150), and further analyze the well log data, the core sample data, seismic data, and/or other types of data to generate and/or update the one or more reservoir models (170). In some embodiments, the control system (114), the logging system (112), and/or the reservoir simulator (160) may include a computer system that is similar to the computer system (600) described below with regard to FIG. 6 and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, water saturation, and the like. The resulting logging measurements may be stored and/or processed, for example, by the control system (114), to generate corresponding well logs (140) for the well (102). A well log may include, for example, a plot of a logging response time vs true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples (150) and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores") from the formation (106) and bring the plugs to the surface, and these core samples may be analyzed at the surface (e.g., in a lab) to determine various characteristics of the formation (106) at the location where the sample was obtained.

Multiple types of logging techniques are available for determining various reservoir characteristics, and a particular form of logging may be selected and used based on the logging conditions and the type of desired measurements. For example, NMR logging measures the induced magnetic moment of hydrogen nuclei (i.e., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. For determining permeability, another type of logging may be used that is called spontaneous potential (SP) logging. SP logging may determine the permeabilities of rocks in the formation (106) by measuring the amount of electrical current generated between drilling fluid produced by the drilling system (110) and formation water that is held in pore spaces of the reservoir rock. Porous sandstones with high permeabilities may generate more electricity than impermeable shales. Thus, SP logs may be used to identify sandstones from shales.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores.

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high resistivities. As such, resistivity measurements obtained via such logging can be used to determine corresponding reservoir water saturation ($S_w$).

In some embodiments, the reservoir simulator (160) is implemented in a software platform for a control system (114) for drilling. The software platform may obtain data acquired by the drilling system (110) and logging system (112) as inputs, which may include multiple data types from multiple sources. The software platform may aggregate the data from these systems (110, 112) in real time for rapid analysis. As such, the output of the reservoir simulator (160)

may be a near real-time reservoir/non-reservoir distribution map of the formation (106) in dolomitized carbonates.

In some embodiments, a well trajectory design for the wellbore (104) is updated based on an updated reservoir model by the control system (114), e.g. a well design module responsible for managing well trajectory. For example, a reservoir simulator (160) may communicate changes in a reservoir model for a geological region of interest to the control system (114), wherein the control system subsequently adjusts a well trajectory design accordingly. As such, the control system (114) may generate one or more control signals for drilling equipment based on the updated well trajectory design and/or reservoir model to control drilling by the drilling system (110). In particular, the control system (114) may modify the well trajectory in order to pass a drill bit through good reservoir regions and/or to avoid tight dolomite (e.g., drilling problems may be encountered in a severe dolomitized area, such as loss of circulation). Thus, a reservoir model describing dolomite boundaries and various types of reservoir regions may enable drillers to collaboratively design a drill trajectory using the reservoir model. Such a reservoir model may also provide drilling engineers and a rig site to continuously monitor and analyze drilling operations for an individual well or a group of rigs.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
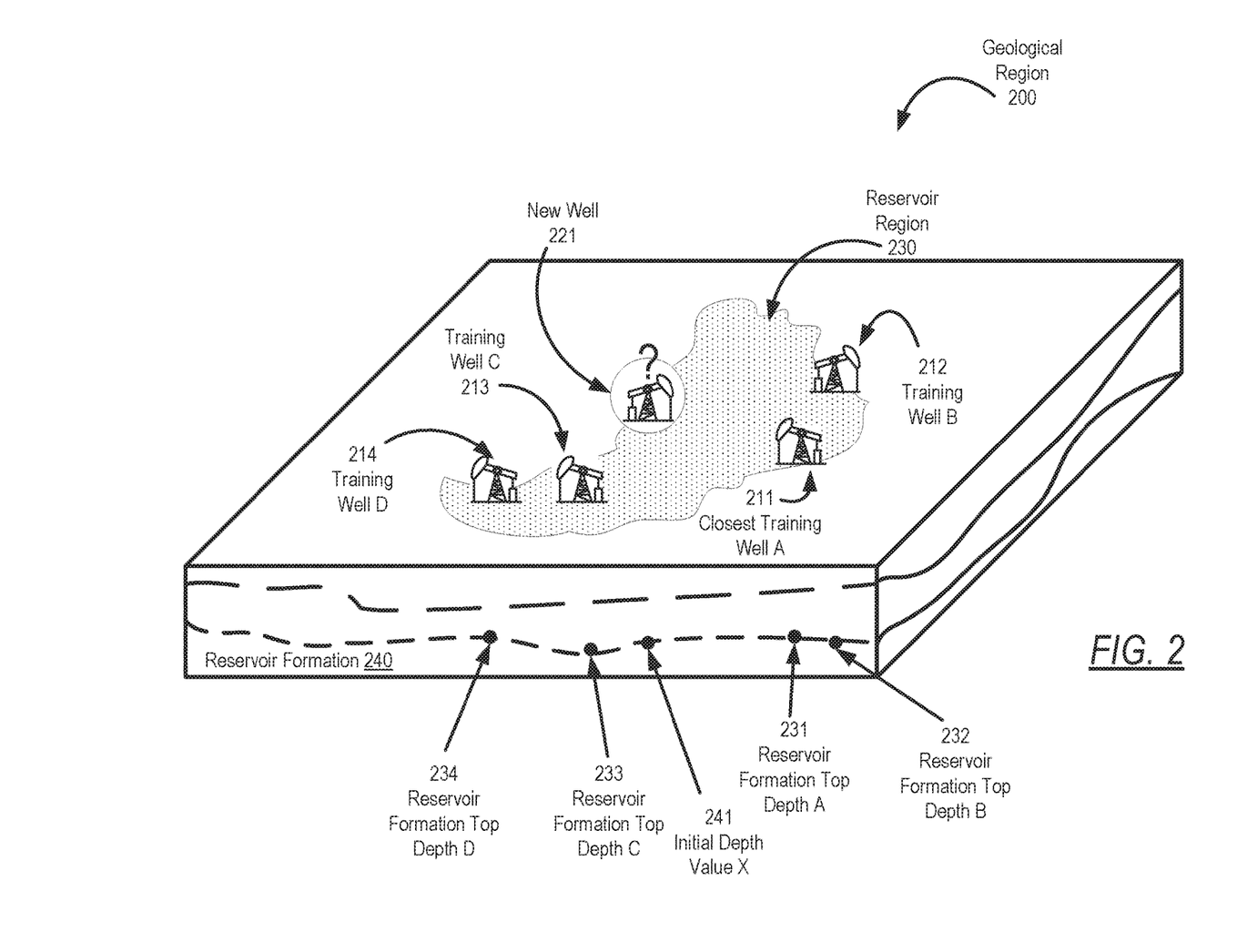

Turning to FIG. 2, FIG. 2 shows a schematic diagram in accordance with one or more embodiments. As illustrated in FIG. 2, FIG. 2 shows a geological region (200) that may include one or more reservoir regions (e.g., reservoir region (230)) with various training wells (i.e., closest training well A (211), training well B (212), training well C (213), and training well D (214)) and a new well (e.g., well (221)). Training wells may include wells where the depth of one or more formation tops are previously determined, e.g., by drilling to the formation and/or predicting through well log data. To determine the closest training well to the new well (221), the wells (211, 212, 213, 214) may be analyzed according to the shortest Euclidean distance. For example, in FIG. 2, training well A (211) is the closest well to the new well (221).

Keeping with FIG. 2, the training wells (211, 212, 213, 214) are disposed above a reservoir formation (240) and have respective formation top depths (i.e., reservoir formation top depth A (231) for closest training well A (211), reservoir formation top depth B (232) for training well B (212), reservoir formation top depth C (233) for training well C (213), and reservoir formation top depth D (234) for training well D (214)). Using a 2D kriging surface interpolation method, an initial guess (i.e., initial depth value X (241)) is determined for the reservoir formation top depth of the new well (221).

Figure 3:
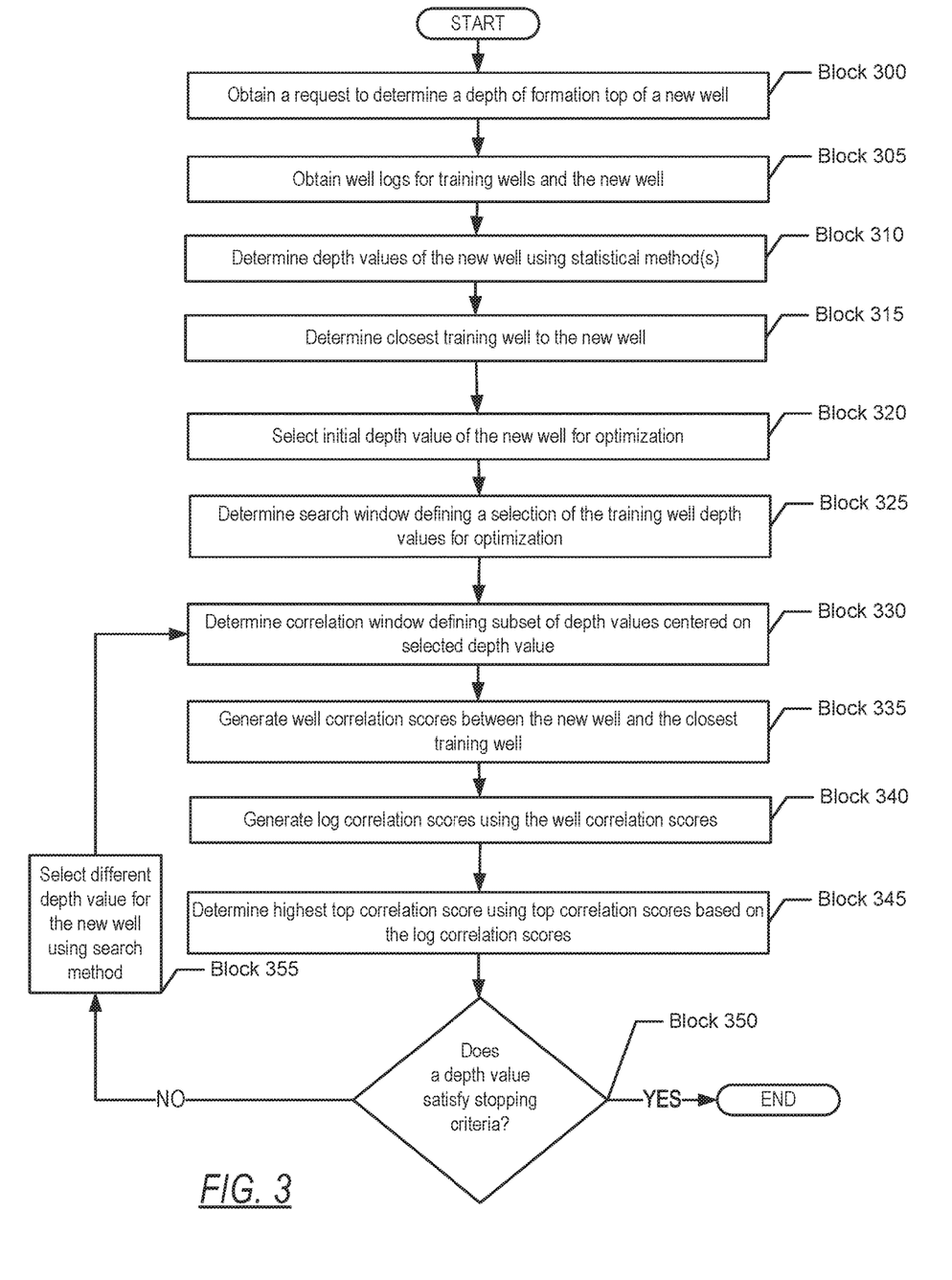
FIG. 3 shows a flowchart in accordance with one or more embodiments.

Turning to FIG. 3, FIG. 3 shows a flowchart in accordance with one or more embodiments. Specifically, FIG. 3 describes a general method for determining a final formation top depth using well logs. One or more blocks in FIG. 3 may be performed by one or more components (e.g., reservoir simulator (160)) as described in FIG. 1. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Furthermore, a closest training well is determined and a depth grid array for the new well is created. A search window and a correlation window are also determined, wherein the correlation window size is smaller than the search window size. Correlation scores between log data of the new well log and the log data of the recommended logs of the closet training well are calculated with the correlation window. The depth with the highest correlation score corresponds to the best formation top depth of the new well.

In Block 300, a request is obtained to determine a depth of a formation top of a new well in accordance with one or more embodiments. For example, in response to a user input, a reservoir simulator may initiate the process described in FIG. 3. Likewise, the request may be performed automatically by one or more software programs. For example, while drilling in a subsurface formation, a control system may predict the depth of the next formation top within the well path.

In Block 305, various well logs are obtained for training wells and a new well in accordance with one or more embodiments. For example, well logs may be acquired using a logging system (112) and/or logging tools (113) described above in FIG. 1 and the accompanying description. In some embodiments, a list of the most representative well logs (i.e., recommended logs list) is obtained for a specific formation top signature. For example, certain types of well log data may provide a better indicator of formation properties. Thus, depending on the type of formation, one or more well log types may be used for further analysis.

In Block 310, various depth values of a new well are determined using one or more statistical interpolation methods in accordance with one or more embodiments. In particular, the depth values may be an initial set of depth values for being input to the process described in Blocks 330-355 below. This set of depth values provides various possible options for determining an optimized depth value. In some embodiments, for example, a statistical interpolation method may include a Kriging statistical method or a Cokriging statistical method to determine the depth values, but other interpolation methods are contemplated as well.

With respect to Kriging statistical methods, a Kriging statistical method may be a method of interpolation for which topographical values may be modeled by covariance. Under certain assumptions, for example, a Kriging statistical method may predict intermediate values between acquired data points, e.g., well log data points. To generate a prediction surface map with a Kriging statistical method, for example, the process may include generating variograms and covariance functions to estimate a statistical dependence that depends autocorrelation, e.g., fitting data points to a geostatistical model. Thus, a Kriging statistical method may predict unknown depth values of one or more formations. In some embodiments, a Kriging statistical method is expressed using the following equation:

$$z_0 = \sum_{i=1}^{n} \lambda_i z_i \qquad \text{Equation 1}$$

where $z_0$ may be a prediction location of a depth value; $\lambda_i$ may be a specified weight for a measured well log value at the $i^{th}$ location; $z_i$ is a measured well log value at the location; and n is the number of measured well log values.

In some embodiments, the depth values are determined using a Cokriging statistical method. A Cokriging statistical method may be a variation of a kriging statistical method that uses two or more variable types. Cokriging may require more processing than a Kriging statistical method, such as by estimating the autocorrelation for each variable as well as various cross-correlations among the variables. In some embodiments, a Cokriging statistical method may be expressed using the following equation:

$$z_0 = \sum_{i=1}^{n} \lambda_i z_i + \sum_{j=1}^{n} \beta_j t_j \qquad \text{Equation 2}$$

where $z_0$ may be a prediction location of a depth value; $\lambda_i$ may be a specified weight for a measured well log value at the $i^{th}$ location; $z_i$ may be the measured well log value at the $i^{th}$ location; $\beta_j$ may be another specified weight for the measured well log value at the $j^{th}$ location; $t_j$ may be the measured well log value at the $j^{th}$ location, that is co-located with $z_i$; and n may be the number of measured well log values.

In Block 315, a closest training well to a new well is determined in accordance with one or more embodiments. Among a set of wells with corresponding well logs, the closest training well may be a particular well that is the shortest Euclidean distance to the new well. For example, the closest training well may be determined using the following equation:

$$\text{dist}_i = \sqrt{(TW_{xi} - NW_x)^2 + (TW_{yi} - NW_y)^2} \qquad \text{Equation 3}$$

where $\text{dist}_i$ is the distance between a training well i and the new well; $TW_{xi}$ and $TW_{yi}$ are the x and y coordinates for training well i; $NW_x$ and $NW_y$ are the x and y coordinates for the new well.

In Block 320, an initial depth value of a new well is selected for optimization in accordance with one or more embodiments. For example, the selected depth value may be chosen from the depth values of the new well determined in Block 310. In some embodiments, the initial depth may be a user input, e.g., chosen by a user operating a software program on a reservoir simulator. Likewise, the selected depth value may be a default value, such as a the median value among a set of depth values produced by a statistical interpolation method.

In Block 325, a search window defining a selection of training well depth values is determined in accordance with one or more embodiments. For example, the search window may define a list of depth values for running an optimization algorithm. In particular, the search window may be centered on the initial depth value from Block 320. The size of the search window may be defined by a user input.

In Block 330, a correlation window defining a subset of training well depth values is determined in accordance with one or more embodiments. More specifically, the correlation window may be a moveable window for searching the depth values in a search window. For example, the correlation window may provide other depth values for comparing correlation scores to those of the selected depth value in Blocks 330-340 below. Thus, as the iterative workflow in FIG. 3 searches for an optimized depth value, the correlation window may add and/or remove well logs from the analysis. In Blocks 335-345 below, for example, well correlation scores, log correlation scores, and top correlation scores may be generated iteratively using well logs from the new well and the closest training well.

In Block 335, various well correlation scores between a new well and a closest training well are generated in accordance with one or more embodiments. In some embodiments, for example, the well correlation scores may be generated using a Pearson correlation coefficient. For example, a Pearson correlation coefficient may be determined using the following equation:

$$\rho_{xy} = \frac{\sum_{i=1}^{N}(X_i - \overline{X})(Y_i - \overline{Y})}{\sqrt{\sum_{i=s}^{N}(X_i - \overline{X})^2 \sum_{i=s}^{N}(Y_i - \overline{Y})^2}} \qquad \text{Equation 4}$$

where $\rho_{xy}$ is the Pearson correlation coefficient between well X and well Y (e.g., well X may be the closest training well and well Y may be the new well); N may be the total number of depth values within the correlation window; $X_i$ may be the $i^{th}$ well log value for well X; $\overline{X}$ is the average for well log values within the correlation window for well X; $Y_i$ is the $i^{th}$ well log value for well Y; and $\overline{Y}$ is the average for the well log values within the correlation window for well Y.

Keeping with Block 335, in some embodiments, well correlation scores between a new well and a closest training well are generated using the following equation:

$$wcs_i = \frac{\sum_{j=s}^{N} \rho_{ij}}{N} \qquad \text{Equation 5}$$

where $wcs_i$ is the well correlation score for well i; $\rho_{ij}$ is Pearson correlation coefficient between well i and well j; N is the total number of wells being analyzed (e.g., total number of training wells).

In Block 340, various log correlation scores are generated using various well correlation scores in accordance with one or more embodiments. In particular, a log correlation score may be calculated for each log in a recommended log list using the list of recommended logs (for example, logs a, log b, and log c) and a Pearson correlation coefficient between a new well (NW) and a closest training well (CTW). For example, log correlation scores may be generated using the following equation:

$$lcs_i = \frac{\sum_{i=1}^{M} \rho_{CTW_i NW_i}}{M} \qquad \text{Equation 6}$$

where $lcs_i$ is the log correlation score for log i (where log i can be the log a, b, or c from a recommend logs list); $\rho_{CTW_i NW_i}$ is a Pearson correlation coefficient between the closest training well and the new well using the values for log i within a correlation window; and M is the total number of logs in the recommended logs list (which is 3 in the present example). For example, a recommend log list may describe a particular signature of a formation type. Thus, based on which formation top is being analyzed, different recommended log lists may be used to determine the log correlation scores.

In Block 345, a top correlation score is generated using various log correlation scores in accordance with one or more embodiments. For example, the top correlation score may be a normalized sum for all log correlation scores in a particular case that is generated using the following equation:

$$tcs = \frac{\sum_{i=1}^{M} lcs_i}{M} \qquad \text{Equation 7}$$

where tcs is the top correlation score; $lcs_i$ is the log correlation score for log i; and M is the total number of logs in the recommended logs list. Thus, the top correlation score is maximized by using the optimizer by changing the depth of the top at the new well, wherein the depth is limited by minimum and maximum depths.

In Block 350, a determination is made whether a depth value satisfies one or more stopping criteria in accordance with one or more embodiments. For example, the stopping criteria may be a minimum threshold value for the highest top correlation score. In some embodiments, the stopping criteria may include a specific number of optimization iterations, where the depth value with the highest formation stop score after the set number of iterations may be the final depth value. Where, a top correlation score within a correlation window (e.g., the selected depth value or a different depth value) satisfies the stopping criteria, the optimization process may end. If the top correlation scores fail to satisfy the stopping criteria, the process may proceed to Block 355.

In Block 355, a different depth value is selected for a new well using a search method in accordance with one or more embodiments. For example, based on which depth value in the correlation window has the highest top correlation score, the previously selected depth value may be decreased or increased. The newly selected depth value may be used to calculate a new correlation window, new well correlation scores, new log correlation scores, and new top correlation scores in Blocks 330-345.

In some embodiments, formation top depth values may be used in multiple practical applications. In one example, dimensions of a particular formation may be used in reservoir modeling to estimate hydrocarbon deposit and the commercial value of a new well through the formation. Another practical application may be using the depth values of various formation tops to determine a well path for a geosteering operation. For instance, reservoir pressure and formation dip for a well may be estimated based on the location of a formation top.

Figure 4:
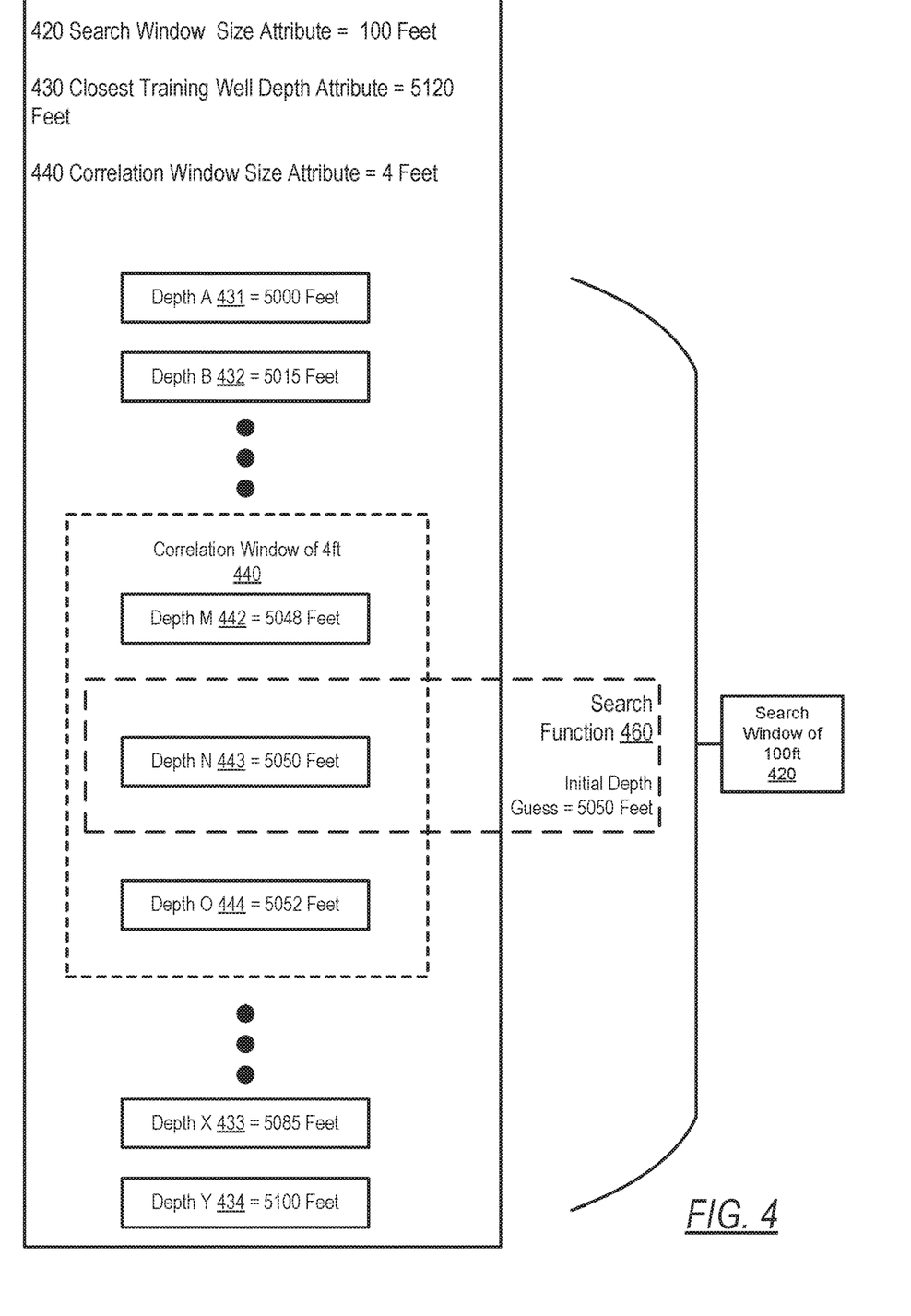
FIGS. 4 and 5 show an example in accordance with one or more embodiments.
Figure 5:
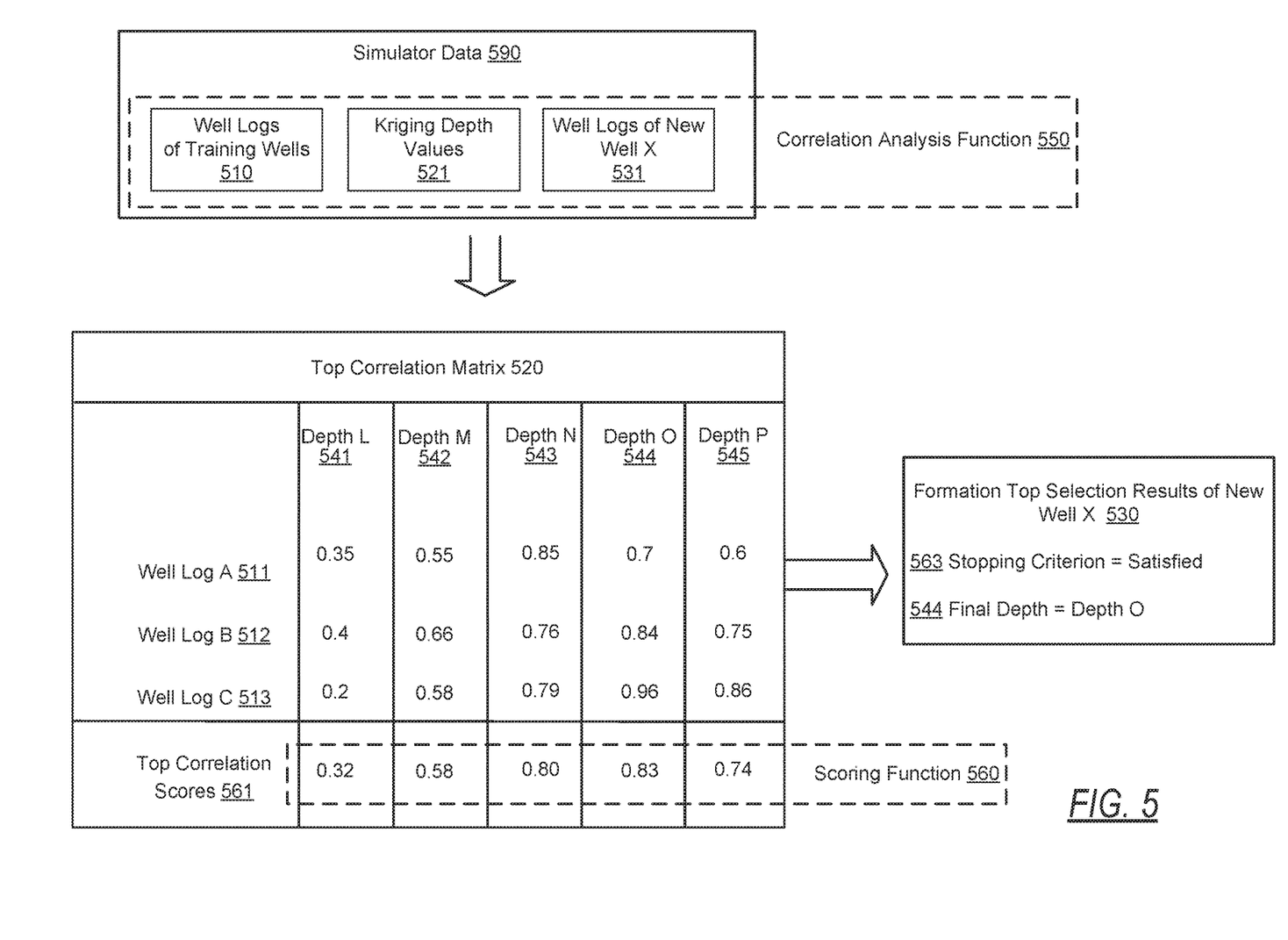

Turning to FIGS. 4 and 5, FIGS. 4 and 5 provide an example of determining an optimized depth value using top correlation scores. The following example is for explanatory purposes only and not intended to limit the scope of the disclosed technology As shown as FIG. 4, the initial depth value of the new well is 5050 feet (i.e., Depth N (443)). The size of a search window (420) is 100 feet (i.e., Search Window Size Attribute (420)), and the size of the correlation window (440) is 4 feet (i.e., Correlation Window Size Attribute (440)). Therefore, the depth grid array for the new well is from 5000 feet to 5100 feet (i.e., Depth A (431), Depth B (432), Depth M (442), Depth N (443), Depth O (444), Depth X (433), Depth Y (434)). The formation top of the closest training well is 5120 feet (i.e., closest training well depth attribute (430)). Log correlation scores will be calculated between the new well and the training well using a search function (460) at each depth value within the depth grid array.

Turning to FIG. 5, a reservoir simulator uses simulator data (590) to predict a formation top's depth. In particular, the simulator data (590) includes well logs of training wells (510), Kriging depth values (521), and well logs of a new well X (531). Using a correlation analysis function (550), the simulator data (590) is used to produce a top correlation matrix (520).

Keeping with FIG. 5, the top correlation matrix (520) includes top correlation scores (561) for a correlation window's depth values (i.e., Depth L (541), Depth M (542), Depth N (543), Depth O (544), and Depth P (545)) that are being analyzed. Furthermore, the top correlation matrix (520) classifies log correlation scores using a recommend log list (i.e., Well Log A (511), Well Log B (512), and Well Log C (513)). The top correlation scores (561) are calculated by summing the respective log correlation scores for a depth value and then divided by the number of logs used (i.e., the number of logs in the recommended log list). In this example, the highest top correlation score is 0.83, which correspond to Depth O (544) at 5052 ft. If 0.83 satisfies the stopping criterion (563), then 5052 feet is the final depth value of the formation top.

Figure 6:
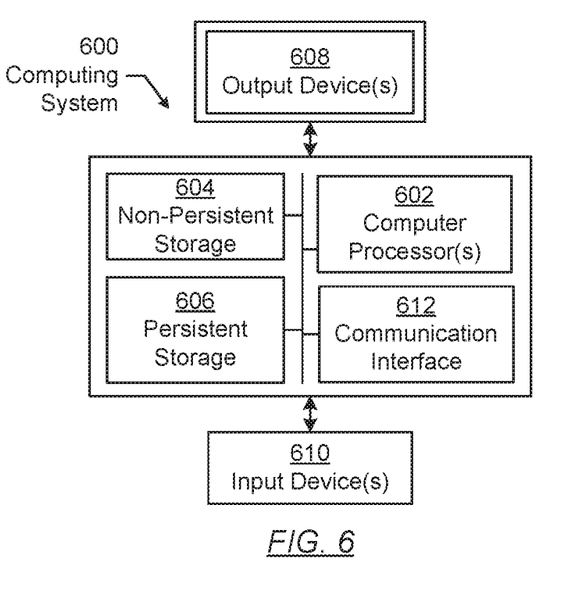
FIG. 6 shows a computing system in accordance with one or more embodiments.

Embodiments may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system or group of computing systems described in FIG. 6 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A—B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
obtaining, by a computer processor, a request to determine automatically a depth of a formation top for a first well in a geological region of interest;
obtaining, by the computer processor, at least one well log regarding the first well and a plurality of well logs regarding a plurality of wells, wherein the plurality of well logs regarding the plurality of wells are acquired in the geological region of interest;
determining, by the computer processor, a plurality of depth values using the plurality of well logs regarding the plurality of wells and a statistical interpolation method, wherein the plurality of depth values describe locations of formation tops interpolated between a plurality of acquired formation top depths;
determining, by the computer processor, a final depth value of the formation top for the first well using the plurality of depth values and a searching method,
generating a plurality of log correlation scores based on the first well and the plurality of wells, and a total number of logs in each of the plurality of well logs regarding the plurality of wells; and
generating a plurality of top correlation scores based on a normalized sum of the plurality of log correlation scores with respect to a predetermined log list,
wherein the plurality of top correlation scores are used by the searching method to determine the final depth value.

2. The method of claim 1, further comprising:
determining a plurality of distances between the first well and the plurality of wells; and
determining a training well among the plurality of wells using the plurality of distances, wherein the training well is closest by distance among the plurality of wells to the first well,
wherein the searching method compares the at least one well log regarding the first well with a subset of well logs among the plurality of well logs corresponding to the training well.

3. The method of claim 1,
wherein the statistical interpolation method is a kriging process that determines the plurality of depth values using a plurality of formation top values that are determined for the plurality of wells, and
wherein the kriging process uses a plurality of predetermined weights.

4. The method of claim 1, further comprising:
determining an initial depth value from among the plurality of depth values for a first iteration of an optimization process;
generating a plurality of top correlation scores using a plurality of log correlation scores based on the at least one well log regarding the first well and the plurality of well logs regarding the plurality of wells;
determining whether a highest top correlation score among the plurality of top correlation scores satisfies a stopping criterion; and
determining, in response to the highest top correlation score failing to satisfy the stopping criterion, a different depth value among the plurality of depth values,
wherein the different depth value is used in a second iteration of the optimization process.

5. The method of claim 4,
wherein the stopping criterion comprises a predetermined threshold for terminating the searching method,
wherein the searching method terminates when the highest top correlation score is above the predetermined threshold.

6. The method of claim 1,
wherein the request is transmitted to a reservoir simulator in response to a user input to a user device.

7. The method of claim 1, further comprising:
determining a search window comprising an initial depth value,
wherein the search window provides a plurality of computed depth values within the search window for a searching algorithm; and
determining a correlation window based on the search window,
wherein the correlation window is a subset of the plurality of computed depth values.

8. A reservoir system, comprising:
a logging system coupled to a plurality of logging tools and a first well in a geological region of interest;
a reservoir simulator comprising a computer processor, wherein the reservoir simulator is coupled to the logging system and comprises functionality for:
obtaining a request to determine automatically a depth of a formation top for the first well;
obtaining, using the logging system, at least one well log regarding the first well;
obtaining a plurality of well logs regarding a plurality of wells, wherein the plurality of well logs regarding the plurality of wells are acquired in the geological region of interest;
determining a plurality of depth values using the plurality of well logs regarding the plurality of wells and a statistical interpolation method, wherein the plurality of depth values describe locations of formation tops interpolated between a plurality of acquired formation top depths;
determining a final depth value of the formation top for the first well using the plurality of depth values and a searching method;
determining an initial depth value from among the plurality of depth values for a first iteration of an optimization process;
generating a plurality of top correlation scores using a plurality of log correlation scores based on the at least one well log regarding the first well and the plurality of well logs regarding the plurality of wells;
determining whether a highest top correlation score among the plurality of top correlation scores satisfies a stopping criterion; and
determining, in response to the highest top correlation score failing to satisfy the stopping criterion, a different depth value among the plurality of depth values,
wherein the different depth value is used in a second iteration of the optimization process.

9. The reservoir system of claim 8, wherein the reservoir simulator comprises functionality for:
determining a plurality of distances between the first well and the plurality of wells;
determining a training well among the plurality of wells using the plurality of distances, wherein the training well is closest among the plurality of wells to the first well, and
comparing the at least one well log regarding the first well with a subset of well logs among the plurality of well logs corresponding to the training well.

10. The reservoir system of claim 8, wherein the request obtained by the reservoir simulator is transmitted to the reservoir simulator in response to a user input to a user device.

11. The reservoir system of claim 8, wherein the reservoir simulator further comprises functionality for:
   determining a search window comprising an initial depth value,
      wherein the search window provides a plurality of computed depth values within the search window for a searching algorithm; and
   determining a correlation window based on the search window,
      wherein the correlation window is a subset of the plurality of computed depth values.

12. The reservoir system of claim 8, wherein the reservoir simulator further comprises functionality for:
   generating a plurality of log correlation scores based on the first well and the plurality of wells, and a total number of logs in each of the plurality of well logs regarding the plurality of wells; and
   generating a plurality of top correlation scores based on a normalized sum of the plurality of log correlation scores with respect to a predetermined log list,
      wherein the plurality of top correlation scores are used by the searching method to determine the final depth value.

13. A non-transitory computer readable medium storing instructions executable by a computer processor, the instructions comprising functionality for:
   obtaining a request to determine automatically a depth of a formation top for a first well in a geological region of interest;
   obtaining at least one well log regarding the first well and a plurality of well logs regarding a plurality of wells, wherein the plurality of well logs regarding the plurality of wells are acquired in the geological region of interest;
   determining a plurality of depth values using the plurality of well logs regarding the plurality of wells and a statistical interpolation method, wherein the plurality of depth values describe locations of formation tops interpolated between a plurality of acquired formation top depths;
   determining a final depth value of the formation top for the first well using the plurality of depth values and a searching method;
   determining an initial depth value from among the plurality of depth values for a first iteration of an optimization process;
   generating a plurality of top correlation scores using a plurality of log correlation scores based on the at least one well log regarding the first well and the plurality of well logs regarding the plurality of wells;
   determining whether a highest top correlation score among the plurality of top correlation scores satisfies a stopping criterion; and
   determining, in response to the highest top correlation score failing to satisfy the stopping criterion, a different depth value among the plurality of depth values,
      wherein the different depth value is used in a second iteration of the optimization process.

14. The non-transitory computer readable medium of claim 13, wherein the instructions further comprise functionality for:
   determining a plurality of distances between the first well and the plurality of wells;
   determining a training well among the plurality of wells using the plurality of distances, wherein the training well is closest among the plurality of wells to the first well, and
      wherein the searching method compares the at least one well log regarding the first well with a subset of well logs among the plurality of well logs corresponding to the training well.

15. The non-transitory computer readable medium of claim 13, wherein the request comprised in the instructions is transmitted to a reservoir simulator in response to a user input to a user device.

16. The non-transitory computer readable medium of claim 13, wherein the instructions further comprise functionality for:
   determining a search window comprising an initial depth value,
      wherein the search window provides a plurality of computed depth values within the search window for a searching algorithm; and
   determining a correlation window based on the search window,
      wherein the correlation window is a subset of the plurality of computed depth values.

17. The non-transitory computer readable medium of claim 13, wherein the instructions further comprise functionality for:
   generating a plurality of log correlation scores based on the first well and the plurality of wells, and a total number of logs in each of the plurality of well logs regarding the plurality of wells; and
   generating a plurality of top correlation scores based on a normalized sum of the plurality of log correlation scores with respect to a predetermined log list,
      wherein the plurality of top correlation scores are used by the searching method to determine the final depth value.

* * * * *